United States Patent
Song et al.

(10) Patent No.: US 10,796,717 B1
(45) Date of Patent: Oct. 6, 2020

(54) PERPENDICULAR MAGNETIC RECORDING WRITE HEAD WITH HEATER AND HEAT SINK FOR PROVIDING TEMPERATURE GRADIENT ACROSS THE MAIN POLE

(71) Applicant: Western Digital Technologies, Inc., San Jose, CA (US)

(72) Inventors: Suping Song, Fremont, CA (US); Zhanjie Li, Pleasanton, CA (US); Kuok San Ho, Emerald Hills, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/926,429

(22) Filed: Jul. 10, 2020

Related U.S. Application Data (62) Division of application No. 16/206,079, filed on Nov. 30, 2018.

(51) Int. Cl.
| | | |
|---|---|---|
| *G11B 5/31* | (2006.01) | |
| *G11B 5/187* | (2006.01) | |
| *G11B 5/115* | (2006.01) | |
| *G11B 5/60* | (2006.01) | |
| *G11B 5/48* | (2006.01) | |
| G11B 5/00 | (2006.01) | |

(52) U.S. Cl.
CPC ............ *G11B 5/1875* (2013.01); *G11B 5/115* (2013.01); *G11B 5/314* (2013.01); *G11B 5/3133* (2013.01); *G11B 5/4826* (2013.01); *G11B 5/607* (2013.01); *G11B 5/6011* (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,493,183 B1 | 12/2002 | Kasiraj et al. |
| 6,940,691 B2 | 9/2005 | Maat |
| 7,023,660 B2 | 4/2006 | Hsiao et al. |
| 7,320,168 B2 | 1/2008 | Han |
| 7,391,590 B2 | 6/2008 | Matono et al. |
| 7,612,965 B2 | 11/2009 | Kurihara |
| 7,898,767 B2 | 3/2011 | Yamanaka |
| 8,582,240 B1 | 11/2013 | Chen et al. |
| 8,861,137 B1 | 10/2014 | Lam et al. |

(Continued)

OTHER PUBLICATIONS

Mallary et al., "Head and Media Challenges for 3 Tb/in(2) Microwave-Assisted Magnetic Recording", DOI 10.1109/TMAG.2014.2305693, IEEE Transactions on Magnetics.

(Continued)

*Primary Examiner* — William J Klimowicz
(74) *Attorney, Agent, or Firm* — Thomas R. Berthold (57) ABSTRACT

A perpendicular magnetic recording write head includes a heater on one side of the pole tip of the main pole and a heat sink on the opposite side of the pole tip. The heater is formed of high resistivity material and is connected to a power source. During writing, power is applied to the heater, which causes a relatively large temperature gradient across the pole tip from the heater to the heat sink. The temperature gradient increases the damping of the ferromagnetic material of the main pole during writing, which increases the switching speed of the main pole.

13 Claims, 8 Drawing Sheets

(56) References Cited

U.S. PATENT DOCUMENTS

| | | | |
|---|---|---|---|
| 8,995,088 B1 | 3/2015 | Boone et al. | |
| 9,105,279 B2 | 8/2015 | Shiroishi | |
| 9,230,571 B1 | 1/2016 | Chen et al. | |
| 9,355,654 B1 | 5/2016 | Mallary | |
| 9,595,280 B2 | 3/2017 | Canchi et al. | |
| 9,672,846 B1 | 6/2017 | Tanaka et al. | |
| 9,792,930 B1 | 10/2017 | Shimizu et al. | |
| 10,032,468 B1 | 7/2018 | Wessel | |
| 10,522,176 B1 * | 12/2019 | Yan | G11B 5/4866 |
| 2005/0018347 A1 | 1/2005 | Hsiao | |
| 2005/0018348 A1 | 1/2005 | Lille | |
| 2005/0047015 A1 | 3/2005 | Matono | |
| 2019/0066719 A1 | 2/2019 | Macken | |
| 2019/0259413 A1 * | 8/2019 | Le | G11B 5/3133 |

OTHER PUBLICATIONS

Liu et al., "Transient enhancement of magnetization damping in CoFeB film via pulsed laser excitation", Appl. Phys. Lett. 109, 042401 (2016).

Brechet et al., "Evidence for a Magnetic Seebeck Effect", DOI: 10.1103/PhysRevLett.111.087205 (Aug. 2013).

* cited by examiner

PERPENDICULAR MAGNETIC RECORDING WRITE HEAD WITH HEATER AND HEAT SINK FOR PROVIDING TEMPERATURE GRADIENT ACROSS THE MAIN POLE

RELATED APPLICATION

This application is a divisional of application Ser. No. 16/206,079 filed Nov. 30, 2018.

BACKGROUND

Field of the Invention

This invention relates generally to perpendicular magnetic recording systems, and more particularly to perpendicular magnetic recording write heads for use in magnetic recording disk drives.

Description of the Related Art

In a perpendicular magnetic recording system like a magnetic recording hard disk drive, the recorded bits are stored in a perpendicular or out-of-plane orientation in the recording layer. The recording or write head in perpendicular magnetic recording disk drives includes a write pole comprising a shaped pole and a main pole for writing to the recording layer, and one or more return poles for return of magnetic flux from the recording layer.

The write head must be able to write data not only at high bit-density but also at high data-rates. The write speed is particularly important in enterprise disk drives. However, the switching time for the main pole of the write head to switch from one magnetization direction to the other is a limiting factor as the data rate is increased.

SUMMARY

At high data-rates, the available magnetic flux from the write head, as seen by the recording layer on the disk, is dominated by the low-frequency flux output of the write head. The reason for such loss of write flux includes a slow intrinsic time-constant of the magnetization reversal in the main pole of the write head.

Embodiments of this invention relate to a write head with increased switching speed from one magnetization direction to the other. In embodiments of this invention, a heater is located on one side of the main pole and a heat sink is located on the opposite side of the main pole. The heater is formed of high resistivity material and is connected to a power source. During writing, power is applied to the heater, which causes a relatively large temperature gradient across the main pole from the heater to the heat sink. The temperature gradient increases the damping of the ferromagnetic material of the main pole during writing, which increases the switching speed of the main pole. It has been reported that a transient temperature increase in a CoFeB film due to laser pulsing can increase the Gilbert damping constant by a factor of 10. Liu, et al., "Transient enhancement of magnetization damping in CoFeB film via pulsed laser excitation", APPLIED PHYSICS LETTERS 109, 042401 (2016). The increase in damping of a ferromagnetic material by a temperature gradient has been explained as due to the magnetic analog of the well-known Seebeck effect. Brechet et al., "Evidence for a Magnetic Seebeck Effect", PHYSICAL REVIEW LETTERS 111, 087205 (2013).

U.S. Pat. No. 7,023,660 B2, assigned to the same assignee as this application, describes a write head with a heating element near the main pole tip and electrically connected to the write coil. The heat is intended to increase the magnetic permeability and reduce the stress in the pole tip, which is attributed to the pole tip's very small dimensions, which may be less than the dimensions of the magnetic domains. In the '660 patent the heat is required to be distributed generally equally across the pole tip to achieve the stress reduction across the entirety of the pole tip, so a temperature gradient is not desired. Thus, a heat sink would be disadvantageous.

For a fuller understanding of the nature and advantages of the present invention, reference should be made to the following detailed description taken together with the accompanying figures.

DETAILED DESCRIPTION

Figure 1:
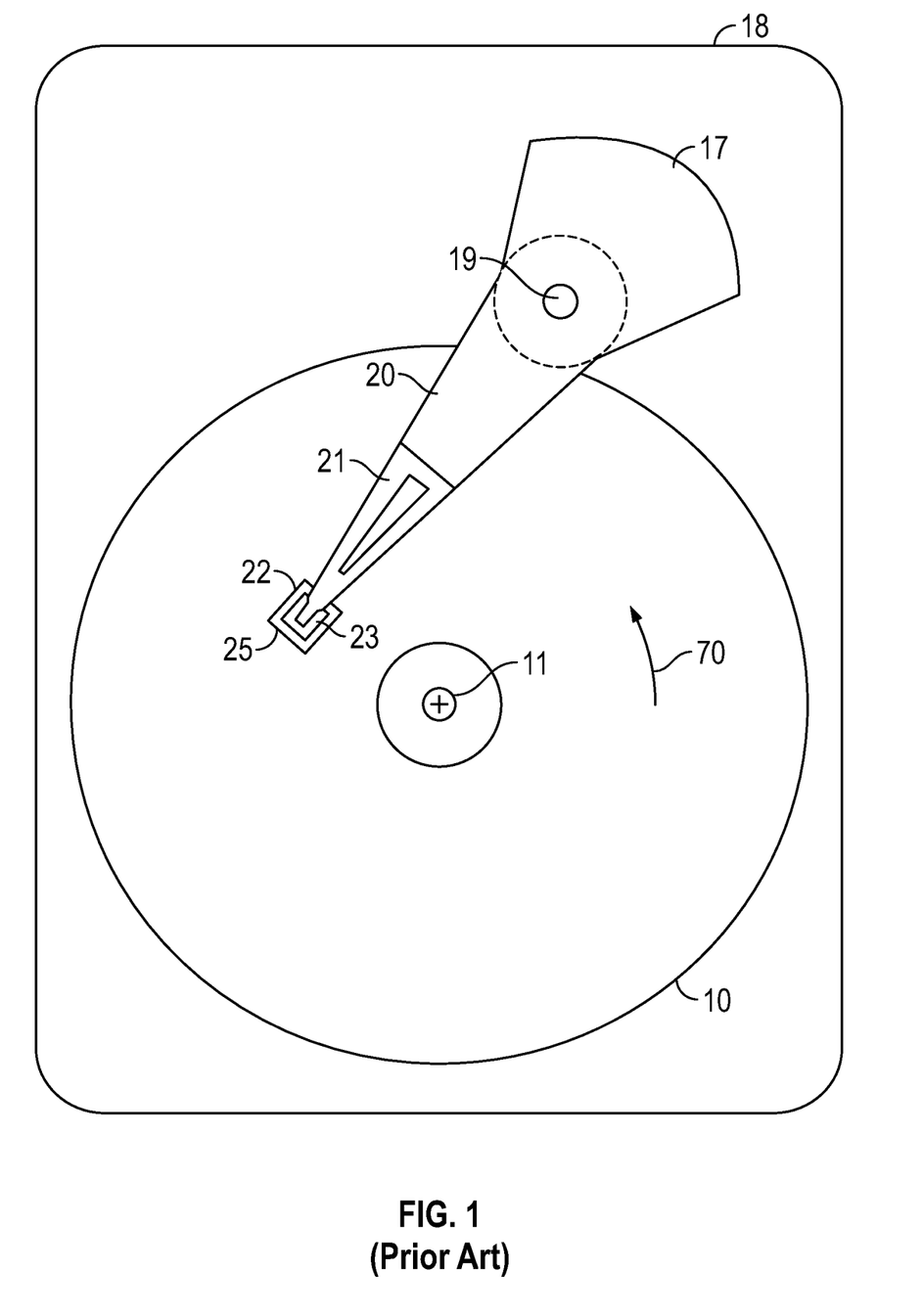
FIG. 1 is a schematic top view of a conventional magnetic recording hard disk drive with the cover removed.

FIG. 1 is a block diagram of a conventional magnetic recording hard disk drive with the cover removed. The disk drive includes a magnetic recording disk 10 and a rotary voice coil motor (VCM) actuator 17 supported on a disk drive housing or base 18. The disk 10 has a magnetic recording layer (RL) with generally concentric data tracks. The disk 10 has a center of rotation 11 and is rotated in direction 70 by a spindle motor (not shown) mounted to base 18. The actuator 17 pivots about axis 19 and includes a rigid actuator arm 20. A generally flexible suspension 21 includes a flexure element 23 and is attached to the end of arm 20. A head carrier or air-bearing slider 22 is attached to the flexure 23. A magnetic recording read/write head (not shown) is formed on the trailing surface 25 of slider 22. The flexure 23 and suspension 20 enable the slider to "pitch" and "roll" on an air-bearing generated by the rotating disk 10. Typically, there are multiple disks stacked on a hub that is rotated by the spindle motor, with a separate slider and read/write head associated with each disk surface.

Figure 2A:
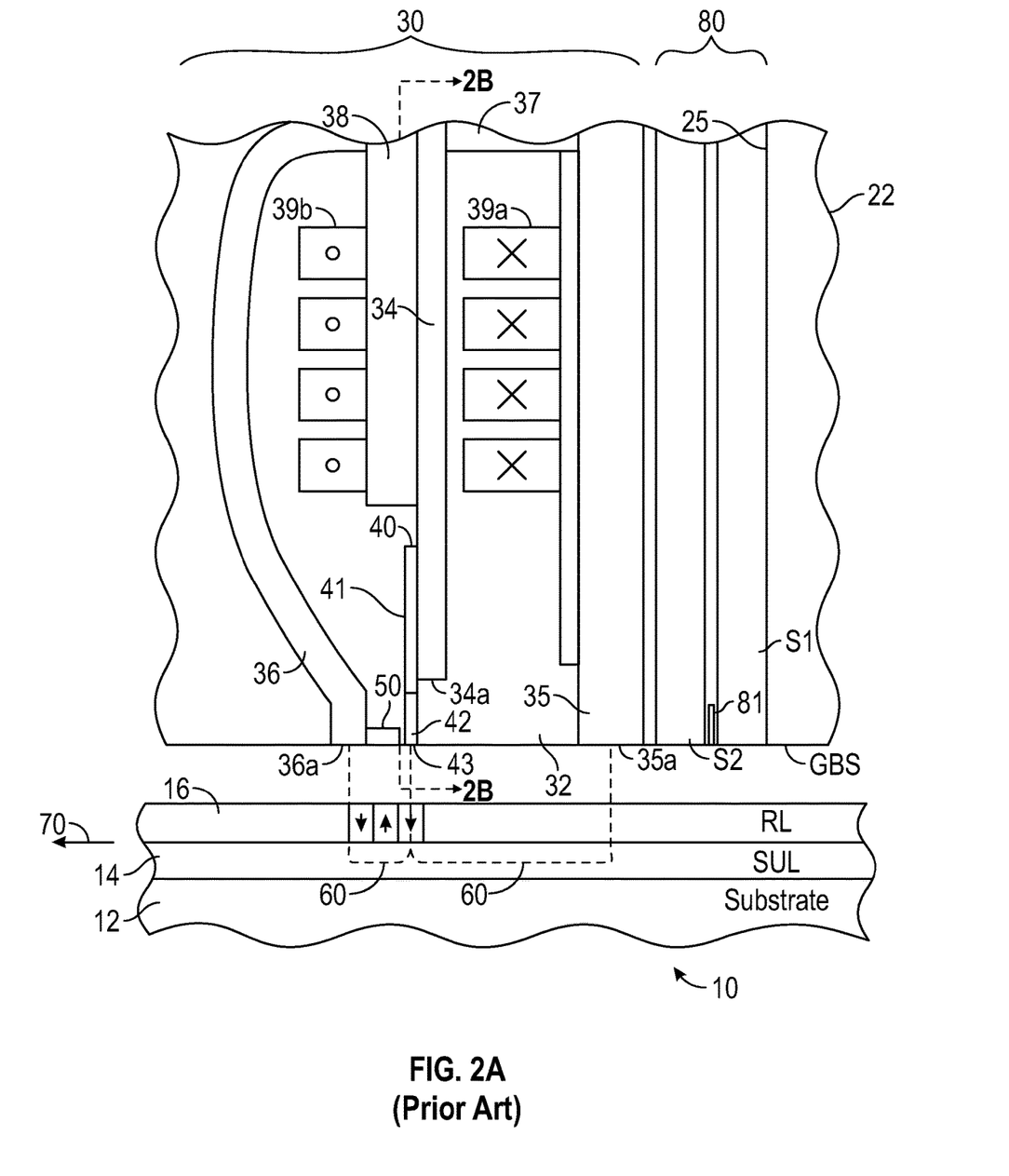
FIG. 2A is a side sectional view of a conventional perpendicular magnetic recording system showing a read head, a write head, and a recording medium taken through a plane parallel to a data track.

FIG. 2A is a side sectional view of a portion of the slider 22 showing a read head 80, a write head 30, and the recording medium (disk 10) with RL 16 taken through a plane parallel to a data track. As shown in FIG. 2A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a magnetoresistive (MR) read head 80 and a single pole type of recording or write head 30 that are shown in a section taken through a plane parallel with a data track on RL 16. The MR read head 80 includes the MR sensor 81 located between MR shields S1, S2.

The write head 30 includes a yoke made up of the shaped pole 34, also referred to as P2, a first flux return pole 35, also referred to as P1, a yoke stud 37 connecting the shaped pole 34 and first return pole 35, a second flux return pole 36, also referred to as P3, a yoke stud 38 connecting the shaped pole 34 and second flux return pole 36, and a thin film coil 39a, 39b shown in section around shaped pole 34. The coil 39a, 39b is depicted as a helical coil wrapped around shaped pole 34, but the coil may also be a well-known "pancake" coil wherein the coil is wrapped around the yoke and the coil segments lie in substantially the same plane. A flared main-pole (MP) 40 is formed over the shaped pole 34 and has a flared portion 41 and a pole tip portion 42 with a pole tip end 43 that faces the outer surface of disk 10. Insulating material 32, typically alumina, separates the coil 39a, 39b from the shaped pole 34 and MP 40 and serves as a substrate for the pole tip 42 and a portion of the main pole 40. Write current through coil 39a, 39b induces a magnetic field (shown by dashed line 60) from the MP 40 that passes through the RL 16 to write to the RL 16 by magnetizing the region of the RL 16 beneath the MP 40. The magnetic field 60 is directed from the RL 16 through the flux return path provided by the SUL 14, and back to the flux return poles 35, 36. The read head 80 and write head 30 are formed as a series of films deposited on the trailing surface 25 of slider 22. Slider 22 has a gas-bearing surface (GBS) that faces the disk 10. The pole tip end 43 is located substantially at the GBS, and the first and second return poles, 35, 36 have ends 35a, 36a, respectively, that are located substantially at the GBS and thus generally coplanar with pole tip end 43. The shaped pole 34 serves as a substrate on which MP 40 is formed and has an end 34a that is recessed from the GBS. In FIG. 2A the disk 10 moves past the recording head in the direction indicated by arrow 70. The RL 16 is illustrated with perpendicularly recorded or magnetized regions, with adjacent regions having opposite magnetization directions, as represented by the arrows. The magnetic transitions between adjacent oppositely directed magnetized regions are detectable as resistance changes by the MR sensor 81 as the recorded bits. FIG. 2A also illustrates a trailing shield (TS) 50 that is spaced from the pole tip 42 to define a write gap. The yoke and shields of write head 30 are formed of soft ferromagnetic material, such as alloys of NiFe, CoFe and NiFeCo that are typically formed by electroplating. The shaped pole 34 and MP 40 are formed of a high-moment material, such as a high-moment CoFe alloy with Fe present between 60 and 80 wt. %. The CoFe alloy may comprise just Co and Fe or may contain one or more other elements, such as Ni, Al, Ta, Hf, B, N and C.

Figure 2B:
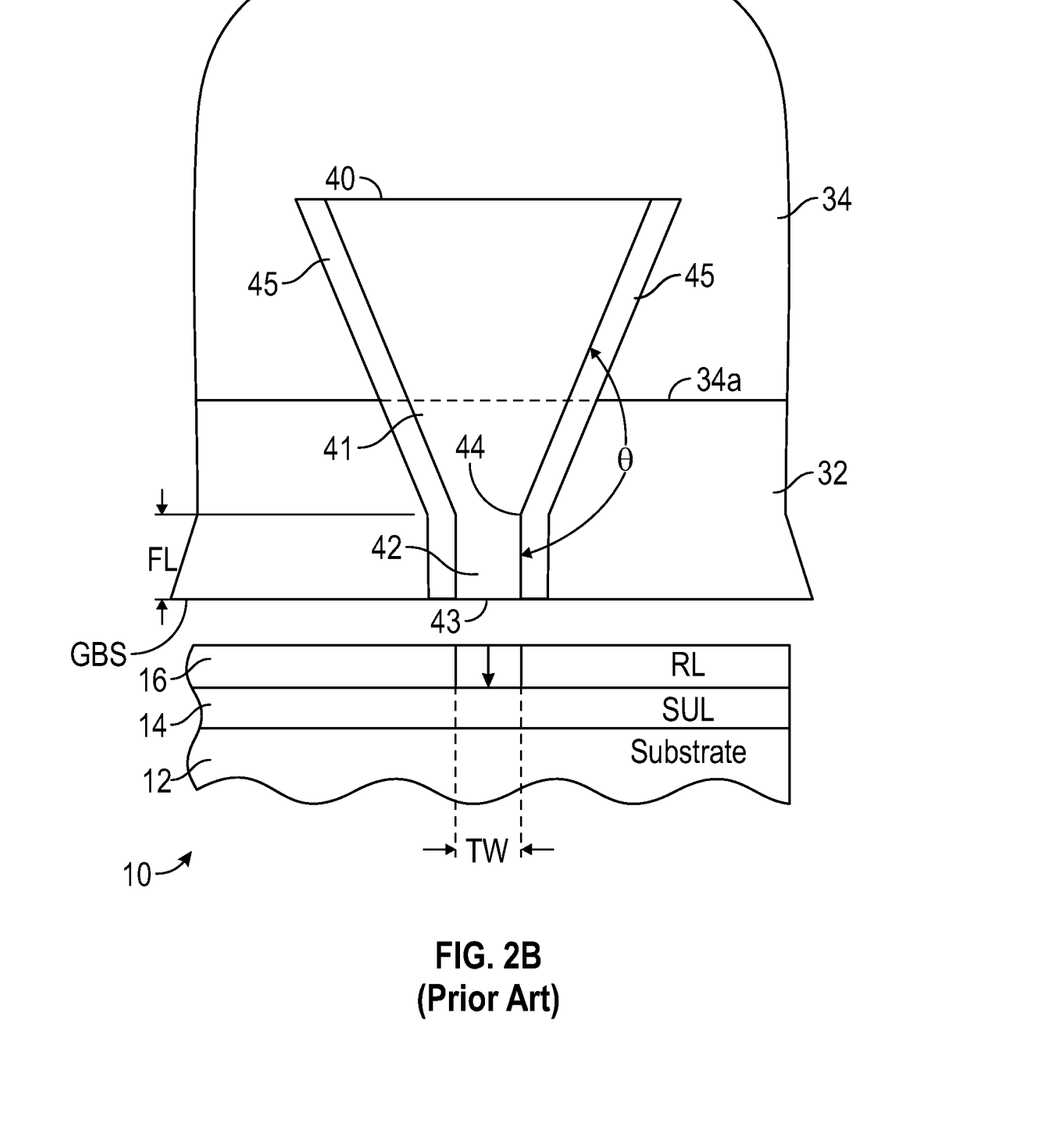
FIG. 2B is a view in the direction 2B-2B of FIG. 2A and illustrates the width of the main pole's pole tip to substantially define the trackwidth (TW) of the data recorded in the recording layer (RL).

FIG. 2B shows a shaped pole 34 which serves as the substrate for the MP 40. Shaped pole 34 has its end 34a recessed from the GBS, and better illustrates the flare region 41 of flared MP 40. The region between the pole tip portion 42 and the flare portion 41 is called the flare point 44. The flare point 44 of the MP 40 is sometimes referred to as the "choke" point because it is the point where the flux density is highest and where the MP 40 saturates. The MP tip 42 has a "height" from end 43 to flare point 44 called the flare length (FL). As shown in FIG. 2B, the two side walls of MP tip 42 define its width in the cross-track direction, which substantially defines the trackwidth (TW) of the data recorded in the RL 16. The region of the MP 40 above the flare region 41 is substantially wider than MP tip 42 below the flare region 41 and the flare point 44 is the transition point where the MP 40 begins to widen with distance from the ABS. The angle θ in FIG. 2B is called the flare angle and is between 90 and 180 degrees, typically between about 120 and 150 degrees. The MP 40 includes nonmagnetic side gap layers 45.

Embodiments of this invention relate to a write head with a heater on one side of the main pole and a heat sink on the opposite side of the main pole. During writing, power is applied to the heater, which causes a relatively large temperature gradient across the main pole from the heater to the heat sink. The temperature gradient increases the damping of the ferromagnetic material of the main pole during writing, which increases the switching speed of the main pole.

Figure 3A:
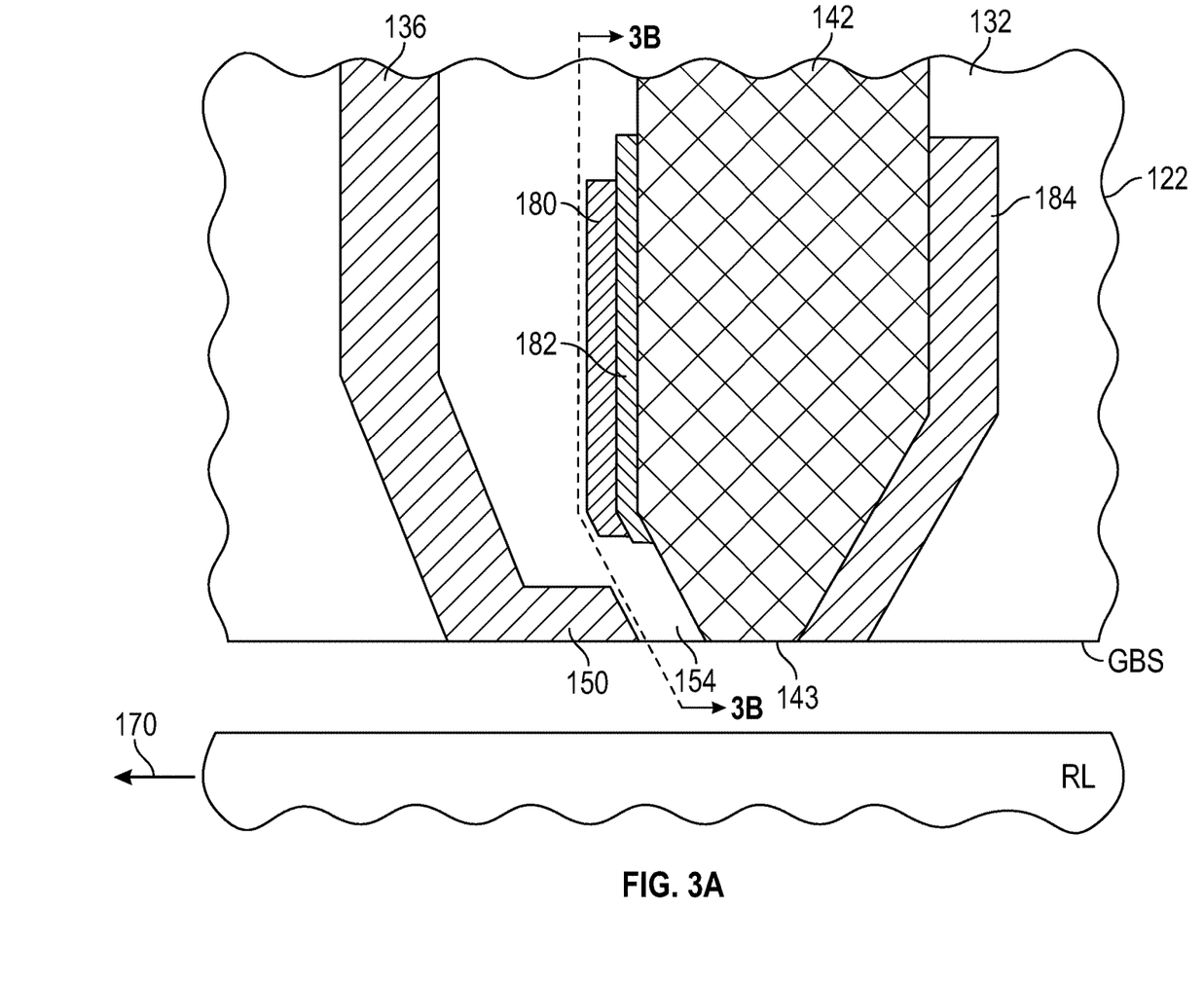
FIG. 3A is a side sectional view of a portion of the slider according to an embodiment of the invention.
Figure 3B:
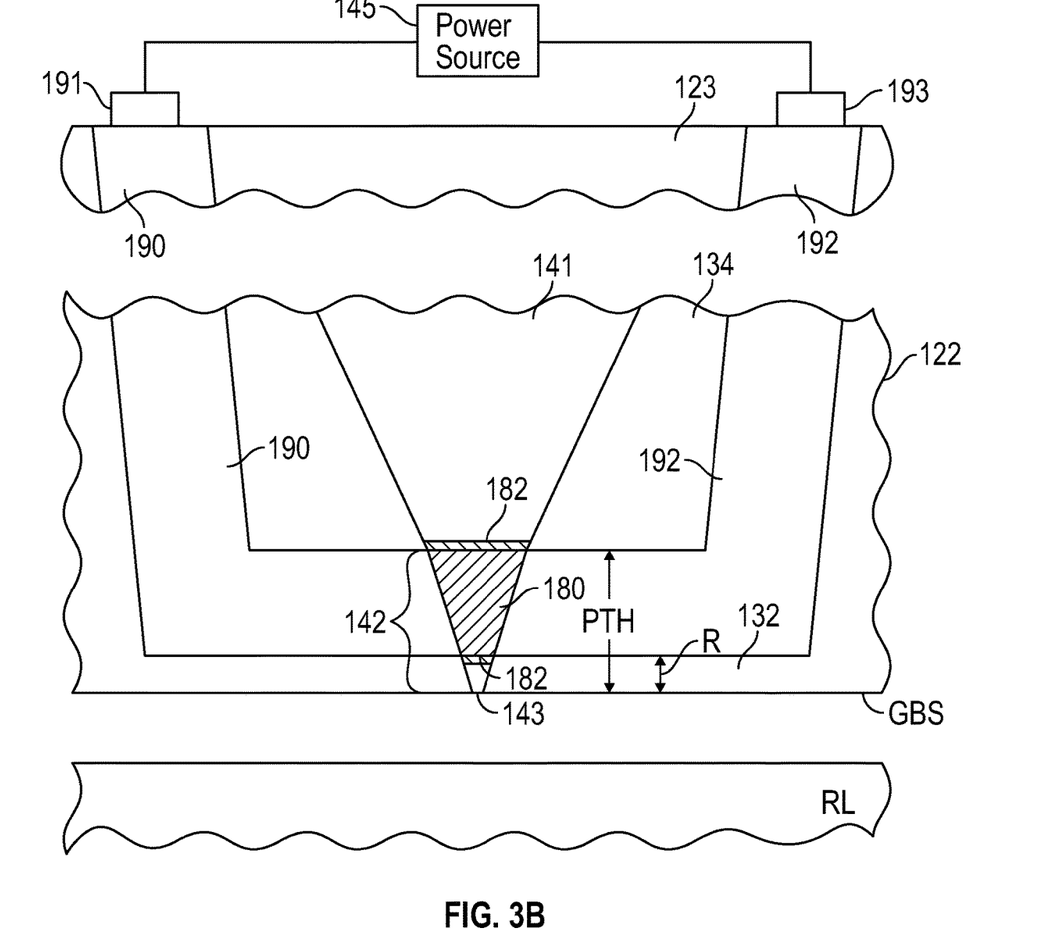
FIG. 3B is a view in the direction 3B-3B of FIG. 3A.

FIG. 3A is a side sectional view of a portion of the slider 122 according to an embodiment of the invention. FIG. 3A illustrates main pole tip 142 with end 143 at the GBS, trailing shield 150 connected to return pole 136, and the RL of the medium that moves in the direction of arrow 170 relative to slider 122. The pole tip 142 is formed on substrate 132, which is typically alumina. FIG. 3B is a view in the direction 3B-3B of FIG. 3A. FIGS. 3A-3B are not to scale because of the difficulty in showing very small dimensions. The trailing shield 150 is spaced from the main pole tip 142 to define a write gap 154. A layer of heater material 180 is formed over the trailing side (the side facing trailing shield 150) of pole tip 142 and a layer of heat sink material 184 is formed on the leading side of pole tip 142. A layer of electrically insulating material 182 is located between heater material 180 and pole tip 142 and electrically isolates the heater material from the pole tip. FIG. 3B shows main pole 141 on shaped pole 134, which serves as a substrate. Pole tip 142 and a portion of main pole 141 are formed on substrate 132, which is typically alumina. The pole tip 142 may have a pole tip height (PTH) from the GBS in the range of about 1.5-2.0 microns. The end of the heater material 180 may extend to the GBS but is preferably recessed from the GBS a recess distance R in the range of about 30-100 nm. The heater material 180 is depicted in FIG. 3B as overlaying primarily the pole tip 142 portion of the main pole 141, but it may also overlay the non-pole tip portion, i.e., the portion above pole tip portion 142 in FIG. 3B. The heater material 180 is connected to electrical leads 190, 192 which extend through to the top 123 of slider 122 where they are connected to pads 191, 193 for electrical connection to power source 145.

The heater material 180 is formed of high resistivity material, preferably at least 100 μOhm-cm, which is higher than the resistivity of the material for leads 190, 192, which are typically Cu or a Cu alloy. The heat sink material 184 is formed of high electrical conductivity material like Cu, Au, Ru and their alloys. The insulating material 182 between the heater material 180 and the pole tip 142 ensures that no electrical current passes through the pole tip 142. When power is applied to heater material 180 during writing, a large temperature gradient is formed form the heater material 180 to the heat sink material 184 across the main pole between the trailing side and leading side of the main pole. This temperature gradient increases the damping of the ferromagnetic material of the main pole, which is typically high-moment CoFe or a CoFe alloy containing one or more other elements, such as Ni, Al, Ta, Hf, B, N and C. The heat sink material on the leading side of the main pole is required to cause the large temperature gradient across the ferromagnetic material of the main pole. The temperature gradient between the trailing side and leading side of the pole tip is in the range of 0.1 to 1.5 K/nm. For a typical pole tip thickness of about 250 nm, this translates into a temperature gradient of between about 25 to 375 K. The increased damping due to the temperature gradient induced during writing increases the rise time of the write field when the magnetization direction is switched. This results in increased switching speed of the write head and thus higher data rates.

Figure 4:
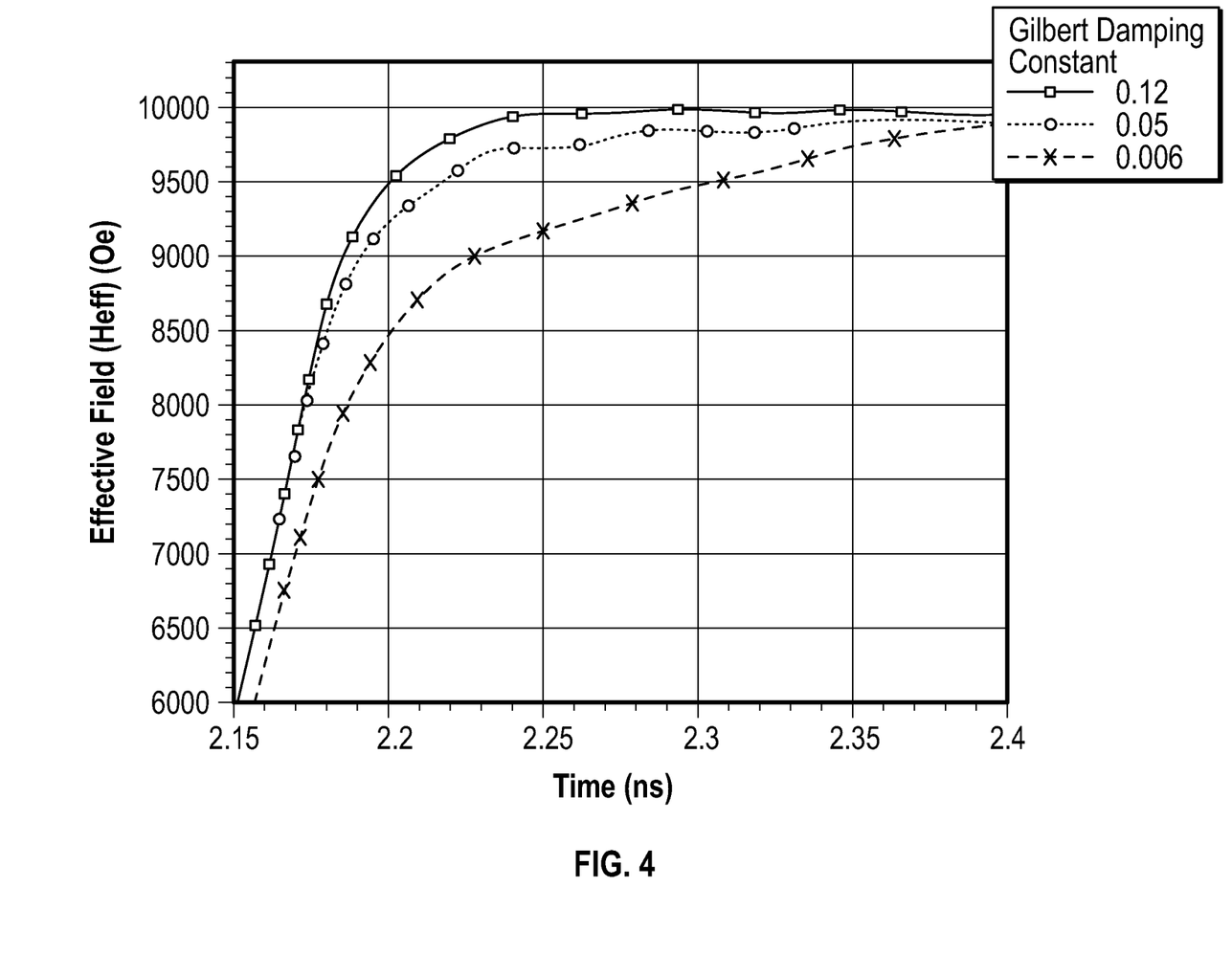
FIG. 4 is a graph of computer modeling of the effective field ($H_{eff}$) measured at the center of a recording layer for at CoFe main pole as a function of time at three different values of Gilbert damping constant.

FIG. 4 is a graph of computer modeling of the effective field ($H_{eff}$) measured at the center of the recording layer for at CoFe as a function of time main pole at three different values of Gilbert damping constant. The intrinsic damping constant for CoFe is about 0.006. At this value the time for the field to rise to 10 KOe is about 230 ps. As the damping increases the rise time decreases. At a damping constant of 0.12 the rise time to 10 kOe is reduced to about 90 ps. A reduction in $H_{eff}$ rise time translates directly into increased switching speed.

Materials suitable for the heater layer include Ta, NiTa, NiFeTa, NiCr and beta-W, all of which have a resistivity equal to or greater than 100 µOhm-cm. The heater material layer may have a thickness in the range of 1-200 nm. Materials suitable for the heat sink include Cu, Au, Ru and their alloys. The heat sink material layer may have a thickness in the range of 10-500 nm. The insulating material may be alumina, silicon nitride or other well-known insulating material with a thickness in the range of 1-50 nm.

Figure 5A:
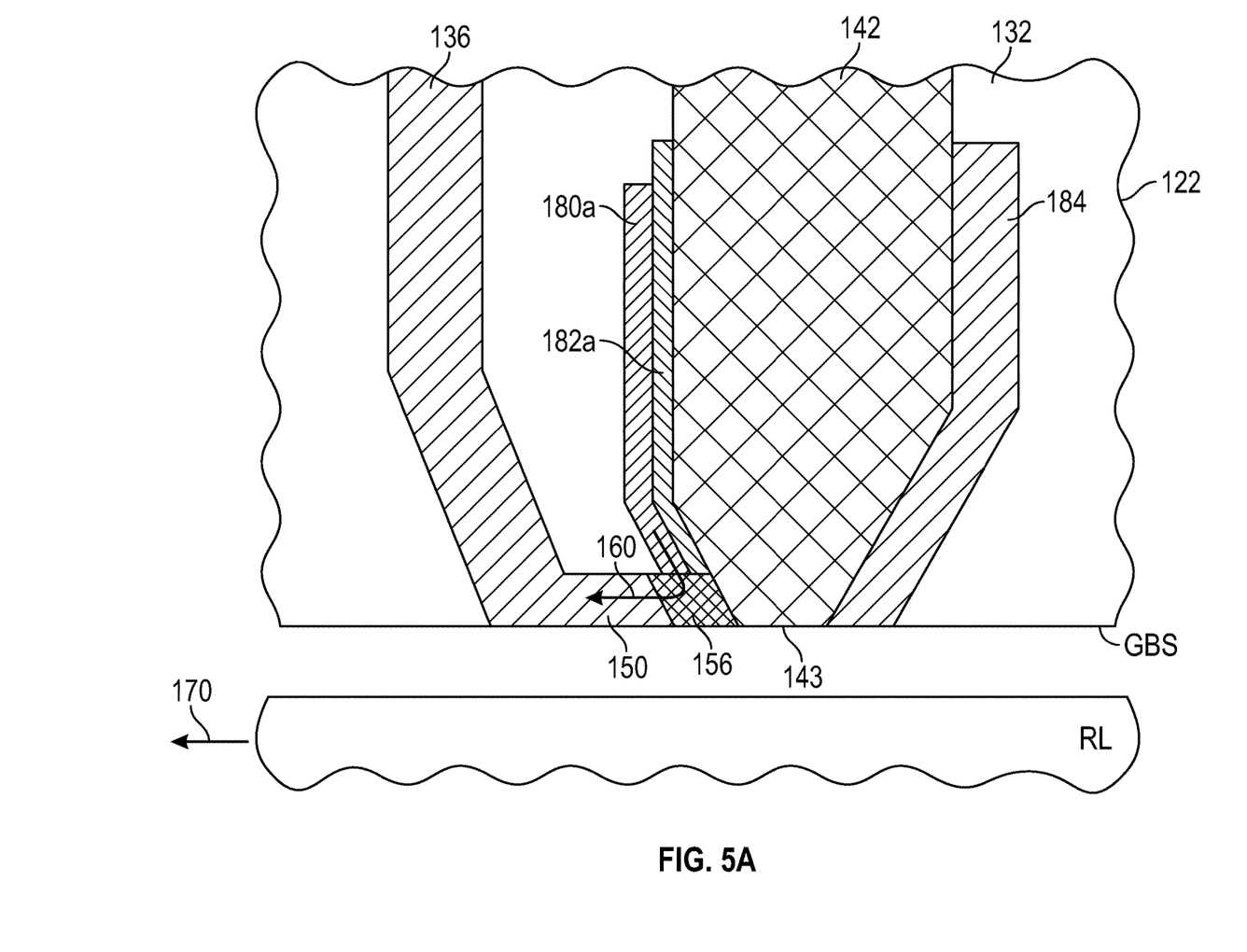
FIG. 5A is a side sectional view of a portion of the slider according to an alternative embodiment of the invention.

FIG. 5A is a side sectional view of a portion of the slider 122 according to an alternative embodiment of the invention. In this embodiment the write gap is filled with electrically conductive material 156, and the layer of heater material 180a extends into contact with the conductive write gap material 156. The insulating material 182a also extends into contact with the write gap material 156 to electrically isolate the heater material 180a from the pole tip 142. In this embodiment the electrical lead 192 (FIG. 3B) is not required because current from the heater material 180a returns through write gap material 156, trailing shield 150 and return pole 136, as shown by arrow 160. The elimination of the lead 192 reduces the need for pad 193 (FIG. 3B) on the top of the slider.

Figure 5B:
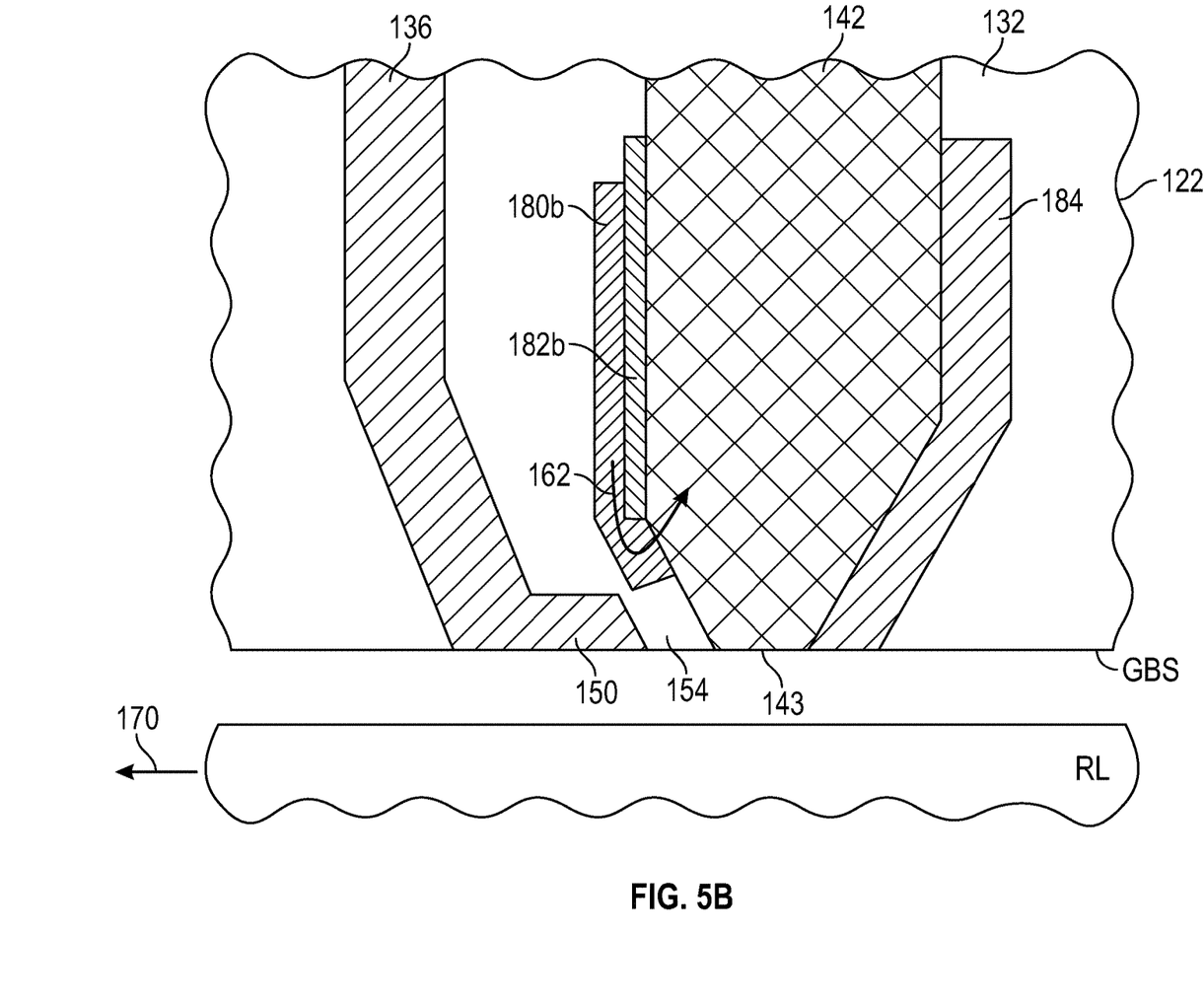
FIG. 5B is a side sectional view of a portion of the slider according to another alternative embodiment of the invention.

FIG. 5B is a side sectional view of a portion of the slider 122 according to another alternative embodiment of the invention. In this embodiment the layer of heater material 180b extends past the layer of insulating material 182b and into contact with the pole tip 142. In this embodiment the electrical lead 192 (FIG. 3B) is not required because current from the heater material 180b returns through the pole tip 142 of the main pole 141 (FIG. 3B), as shown by arrow 162. The elimination of the lead 192 reduces the need for pad 193 (FIG. 3) on the top of the slider.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions of a magnetic recording layer comprising:
    a substrate;
    a main pole of ferromagnetic material on the substrate and having a pole tip, the pole tip having an end for facing the recording layer;
    heat sink material between the substrate and the main pole;
    a layer of electrically conductive heater material having a first portion overlaying the main pole and a second portion in contact with the pole tip; and
    a layer of electrically insulating material between the first portion of heater material and the main pole.

2. The write head of claim 1 further comprising a power supply connected to the layer of heater material for supplying power to the heater material.

3. The write head of claim 1 wherein the heater material has electrical resistivity of at least 100 µOhm-cm.

4. The write head of claim 1 wherein the heater material is selected from Ta, NiTa, NiFeTa, NiCr and beta-W.

5. The write head of claim 1 wherein the heat sink material is selected from Cu, Au, Ru and alloys thereof.

6. The write head of claim 1 further comprising an electrically conductive coil for generating magnetic flux in the main pole.

7. A magnetic recording disk drive comprising:
    a rotatable magnetic recording disk having a recording layer; and
    the write head of claim 1.

8. A perpendicular magnetic recording write head for magnetizing regions of a magnetic recording layer comprising:
    a substrate;
    a main pole of ferromagnetic material on the substrate and having a pole tip, the pole tip having an end for facing the recording layer;
    heat sink material between the substrate and the main pole;
    a layer of electrically conductive heater material overlaying the main pole;
    a layer of electrically insulating material between the heater material and the main pole, wherein the heater material is electrically isolated from the main pole by the electrically insulating layer; and
    a trailing shield of ferromagnetic material having an end for facing the recording layer, the trailing shield end spaced from the pole tip to define a write gap, and electrically conductive material in the write gap, wherein the layer of heater material is in contact with the conductive material in the write gap.

9. The write head of claim 8 further comprising a power supply connected to the layer of heater material for supplying power to the heater material.

10. The write head of claim 8 wherein the heater material has electrical resistivity of at least 100 µOhm-cm.

11. The write head of claim 8 wherein the heater material is selected from Ta, NiTa, NiFeTa, NiCr and beta-W.

12. The write head of claim 8 wherein the heat sink material is selected from Cu, Au, Ru and alloys thereof.

13. The write head of claim 8 further comprising an electrically conductive coil for generating magnetic flux in the main pole.

* * * * *